US009880340B2

(12) United States Patent
Sakamoto

(10) Patent No.: US 9,880,340 B2
(45) Date of Patent: Jan. 30, 2018

(54) LIGHT GUIDE PLATE, LIGHT SOURCE DEVICE, LIGHT GUIDE PLATE MANUFACTURING APPARATUS, AND METHOD FOR MANUFACTURING LIGHT GUIDE PLATE

(71) Applicant: Jun Sakamoto, Osaka (JP)

(72) Inventor: Koji Sakamoto, Osaka (JP)

(73) Assignee: Jun Sakamoto, Osaka (JP)

( * ) Notice: Subject to any disclaimer, the term of this patent is extended or adjusted under 35 U.S.C. 154(b) by 61 days.

(21) Appl. No.: 14/417,380

(22) PCT Filed: Jul. 19, 2013

(86) PCT No.: PCT/JP2013/069653
§ 371 (c)(1),
(2) Date: Jan. 26, 2015

(87) PCT Pub. No.: WO2014/017400
PCT Pub. Date: Jan. 30, 2014

(65) Prior Publication Data
US 2015/0212252 A1 Jul. 30, 2015

(30) Foreign Application Priority Data
Jul. 27, 2012 (JP) .................................. 2012-166720

(51) Int. Cl.
*F21V 7/04* (2006.01)
*F21V 8/00* (2006.01)

(52) U.S. Cl.
CPC ......... *G02B 6/0036* (2013.01); *G02B 6/0055* (2013.01); *G02B 6/0061* (2013.01); *G02B 6/0065* (2013.01)

(58) Field of Classification Search
CPC .. G02B 6/0036; G02B 6/0055; G02B 6/0061; G02B 6/0065
(Continued)

(56) References Cited

U.S. PATENT DOCUMENTS 7,645,058 B2   1/2010  Kurokawa et al.
8,640,368 B2   2/2014  Sato et al.
(Continued)

FOREIGN PATENT DOCUMENTS

CN      2921887 Y    7/2007
CN    101363934 A    2/2009
(Continued)

OTHER PUBLICATIONS

The extended European search report issued by the European Patent Office dated Feb. 26, 2016, which corresponds to European Patent Application No. 13822738.4-1553 and is related to U.S. Appl. No. 14/417,380.
(Continued)

*Primary Examiner* — Elmito Breval
*Assistant Examiner* — Jessica M Apenteng
(74) *Attorney, Agent, or Firm* — Studebaker & Brackett PC

(57) ABSTRACT

A light guide plate according to the present invention includes a light guide member having a first and second main surfaces and a diffusing member next to at least one of the first and second main surfaces of the light guide member. A plurality of recesses are formed in one of the two main surfaces of the diffusing member that is opposite to the main surface next to the light guide member to diffuse light incident to the light guide member at the recesses. The recesses may include a first recess and a second recess. Preferably, when viewing the first main surface of the light guide member in a normal direction, a distance between a light incident surface and the second recess is greater than that between the light incident surface and the first recess, and the second recess is larger than the first recess.

17 Claims, 16 Drawing Sheets

(58) Field of Classification Search
USPC ........................................ 362/611, 97.1–97.4
See application file for complete search history.

(56) References Cited

U.S. PATENT DOCUMENTS

| | | | |
|---|---|---|---|
| 2007/0171671 A1 | 7/2007 | Kurokawa et al. | |
| 2008/0291359 A1* | 11/2008 | Miyashita | G02B 3/0056 349/61 |
| 2009/0072250 A1 | 3/2009 | Inoue | |
| 2010/0039586 A1 | 2/2010 | Park et al. | |
| 2010/0103699 A1 | 4/2010 | Gonda et al. | |
| 2010/0195313 A1 | 8/2010 | Hiraishi et al. | |
| 2011/0096567 A1* | 4/2011 | Tiao | G02B 6/0043 362/607 |
| 2011/0131849 A1 | 6/2011 | Sato et al. | |
| 2011/0222311 A1* | 9/2011 | Kinder | G02B 6/002 362/611 |
| 2013/0163281 A1* | 6/2013 | Wang He | G02B 6/0031 362/611 |
| 2014/0029306 A1 | 1/2014 | Sakamoto et al. | |

FOREIGN PATENT DOCUMENTS

| | | |
|---|---|---|
| CN | 101910879 A | 12/2010 |
| JP | H05-055103 U | 7/1993 |
| JP | H08-160423 A | 6/1996 |
| JP | H09-055111 A | 2/1997 |
| JP | 2000-036208 A | 2/2000 |
| JP | 2000-206318 A | 7/2000 |
| JP | 2003-337333 A | 11/2003 |
| JP | 2007-242856 A | 9/2007 |
| JP | 2009-000875 A | 1/2009 |
| JP | 2010-062138 A | 3/2010 |
| JP | 2010-103068 A | 5/2010 |
| JP | 2010-153103 A | 7/2010 |
| JP | 2010-225562 A | 10/2010 |
| JP | 2012-053273 A | 3/2012 |
| TW | 200912388 A | 3/2009 |
| TW | 200314882 A | 4/2009 |
| WO | 2005/083475 A1 | 9/2005 |
| WO | 2009/119936 A1 | 10/2009 |
| WO | 2012/137805 A1 | 10/2012 |

OTHER PUBLICATIONS

International Search Report; PCT/JP2013/069653; dated Oct. 8, 2013.

An Office Action issued by the Taiwan Patent Office dated Dec. 24, 2014, which corresponds to Taiwan Patent Application No. 10321793800.

The first Office Action issued by the Chinese Patent Office dated Dec. 24, 2015, which corresponds to Chinese Patent Application No. 201380039968.9 and is related to U.S. Appl. No. 14/417,380.

An Office Action issued by the Korean Patent Office dated Feb. 16, 2017, which corresponds to Korean Patent Application No. 10-2015-7003709 and is related to U.S. Appl. No. 14/417,380.

An Office Action; "Notice of Reasons for Refusal," mailed by the Japanese Patent Office dated Nov. 14, 2017, which corresponds to Japanese Patent Application No. 2014-526896 and is related to U.S. Appl. No. 14/417,380; with English Translation.

* cited by examiner

LIGHT GUIDE PLATE, LIGHT SOURCE DEVICE, LIGHT GUIDE PLATE MANUFACTURING APPARATUS, AND METHOD FOR MANUFACTURING LIGHT GUIDE PLATE

TECHNICAL FIELD

The present invention relates to light guide plates, light source devices, light guide plate manufacturing apparatuses, and methods for manufacturing a light guide.

BACKGROUND ART

Light guide plates can emit incident light from its light emitting surface almost uniformly, and therefore, are employed in liquid crystal display devices, lighting devices, etc. Once light from a light source enters a light incident surface provided on a side of a light guide plate, the light repeats reflection between a pair of main surfaces of the light guide plate that face each other to propagate in the light guide plate in the direction (propagation direction) substantially orthogonal to the light incident surface. The light propagating in the light guide plate is emitted from the light emitting surface little by little by optical operation as propagation proceeds in the light guide plate. Note that a diffuser plate is provided between the light guide plate and a liquid crystal display element in typical liquid crystal display devices to allow light from a light source to be emitted uniformly to the liquid crystal display element.

It has been known that a dot pattern in which dots increase in area with the distance away from the light incident surface is formed on a main surface of the light guide plate (Patent Literature 1). Patent Literature 1 discloses that the dot pattern is printed on a surface facing the light emitting surface.

CITATION LIST

Patent Literature

[Patent Literature 1] Japanese Patent Application Laid-Open Publication No. 2012-53273

SUMMARY OF INVENTION

Technical Problem

However, the dot pattern in the light guide plate of Patent Literature 1 protrudes, and therefore, is liable to be rubbed to be scraped away by a reflective film or the like. This may reduce light uniformity.

The present invention has been made in view of the foregoing and has its object of providing a light guide plate, a light source device, and a light guide plate manufacturing apparatus that can prevent reduction in light uniformity, and a method for manufacturing a light guide plate suitable for manufacture of such a light guide plate.

Solution to Problem

A light guide plate according to the present invention includes: a light guide member having a first main surface and a second main surface and a diffusing member next to at least one of the first and second main surfaces of the light guide member. A plurality of recesses are formed in one of the two main surfaces of the diffusing member that is opposite to the main surface next to the light guide member to diffuse light incident to the light guide member at the recesses.

In an embodiment, each of the recesses has a recessed surface with a projection and a depression.

In one embodiment, the recesses include a first recess and a second recess. When viewing the first main surface of the light guide member in a normal direction, a distance between a light incident surface and the second recess is greater than that between the light incident surface and the first recess, and the second recess is larger than the first recess.

In one embodiment, the light guide plate further includes a reflective film configured to reflect the incident light on one of the main surfaces of the light guide member that is opposite to the main surface next to the diffusing member.

In one embodiment, the diffusing member is formed of a plurality of layers including a first layer and a second layer.

In one embodiment, the first layer and the second layer are made of the same material.

In one embodiment, the first layer and the second layer are made of different materials.

A light source device according to the present invention includes the above light guide plate and a light source configured to emit light that is to enter the light guide member.

A light guide plate manufacturing apparatus according to the present invention includes a printing section configured to print an ink for formation of a diffusing member on a light guide member. The printing section includes a pattern roll and a transfer roll. An ink charging portion and a plurality of protrusions having a shape corresponding to a shape of recesses of the diffusing member are formed on the pattern roll. The pattern roll transfers the ink charged in the ink charging portion to the transfer roll. The transfer roll prints the ink on the light guide member.

In an embodiment, the diffusing member includes a plurality of layers including a first layer and a second layer. The light guide plate manufacturing apparatus includes a first printing section configured to print an ink for formation of the first layer of the diffusing member; and a second printing section configured to print an ink for formation of the second layer of the diffusing member. The first printing section includes a first transfer roll and a first pattern roll having a pattern corresponding to a shape of the first layer. The second printing section includes a second transfer roll and a second pattern roll having a pattern corresponding to a shape of the second layer.

In one embodiment, the second printing section is arranged such that the second layer is printed in a displaced manner from the first layer.

In one embodiment, a timing adjusting means is provided that is configured to adjust timing of printing of the second layer such that the second layer is printed in a displaced manner from the first layer.

In one embodiment, a plurality of protrusions having shapes corresponding to shapes of recesses that are formed in the diffusing member are formed on each of the first and second pattern rolls, and the protrusions on the second pattern roll are displaced in a predetermined direction from the protrusions on the first pattern roll.

In one embodiment, a plurality of protrusions including a first protrusion and a second protrusion are formed on the pattern roll. The first and second protrusions are aligned in a predetermined direction. The second protrusion is larger than the first protrusion.

In one embodiment, a reflective film printing section is further provided that is configured to print an ink for formation of a reflective film, the reflective film printing section being arranged to face the printing section.

A method for manufacturing a light guide plate includes: preparing a light guide member having a first main surface and a second main surface; and printing an ink for formation of a diffusing member such that the ink is next to at least one of the first and second main surfaces of the light guide member. A plurality of recesses are formed in one of the two main surfaces of the diffusing member that is opposite to the main surface next to the light guide member to diffuse light incident to the light guide member at the recesses.

In one embodiment, the diffusing member includes a plurality of layers including a first layer and a second layer. The printing includes printing an ink for formation of the first layer of the diffusing member; and printing an ink for formation of the second layer of the diffusing member.

Advantageous Effects of Invention

The light guide plate according to the present invention includes the light guide member and the diffuser member in which a plurality of recesses are formed for light diffusion. This means no protrusion at a part that diffuses light. Thus, the part that diffuses light may not be damaged. In consequence, light uniformity may not be reduced.

DESCRIPTION OF EMBODIMENTS

Embodiments of a light guide plate, a light source, a method for manufacturing a light guide plate, and a light guide plate manufacturing apparatus according to the present invention will be described below with reference to the accompanying drawings. It should be noted that the present disclosure is not limited to the following embodiments.

[First Embodiment of Light Guide Plate]

Figure 1A:
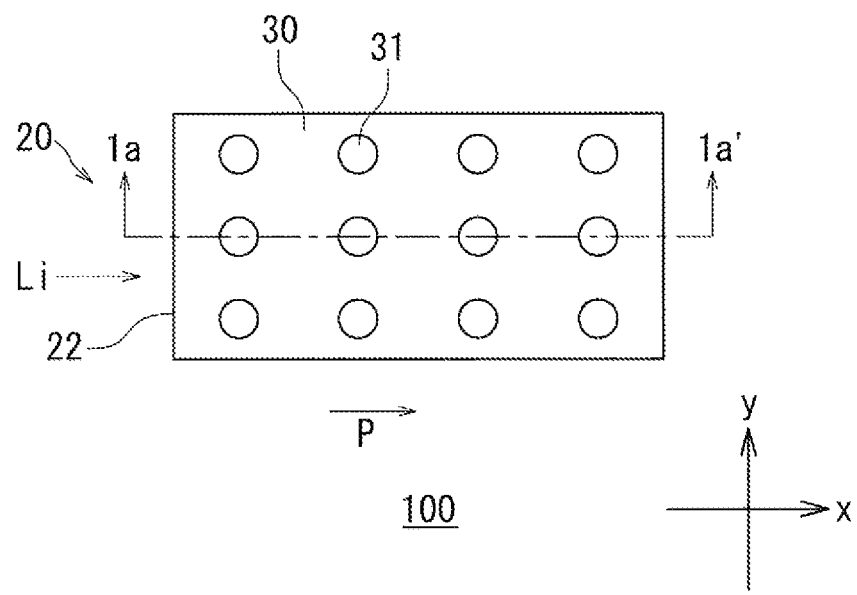
FIGS. 1A and 1B are schematic illustrations illustrating a light guide plate according to one embodiment of the present invention.
Figure 1B:
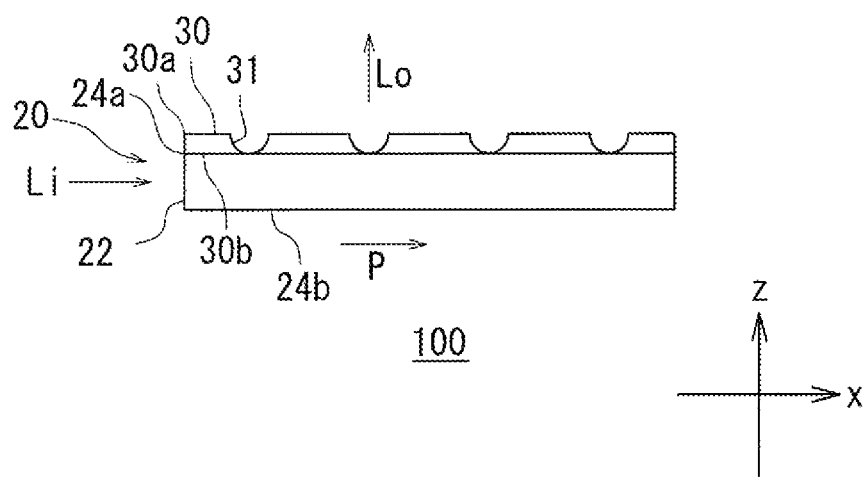

An embodiment of a light guide plate 100 according to the present invention will be described with reference to FIGS. 1A and 1B. FIGS. 1A and 1B present schematic illustrations illustrating the light guide plate 100 according to an embodiment of the present invention. FIG. 1A is a top view of the light guide plate 100. FIG. 1B is a cross sectional view taken along the line 1a-1a' in FIG. 1A.

The light guide plate 100 includes a light guide member 20 and a diffusing member 30. Each of the light guide member 20 and the diffusing member 30 has two main surfaces. The light guide member 20 has main surfaces 24a and 24b. The diffusing member 30 has main surfaces 30a and 30b. A plurality of recesses 31 are formed in the main surface 30a of the diffusing member 30 that is opposite to the main surface 30b next to the light guide member 20. Both the main surfaces 24a and 24b of the light guide member 20 are almost flat. The light guide member 20 has an almost constant thickness. Typically, the areas of the main surfaces 24a and 24b of the light guide member 20 is almost equal to each other.

The light guide member 20 may be made of an acrylic resin such as poly methyl methacrylate resin (PPMA), for example. A light source (not shown) is typically provided around the light guide member. The light guide member 20 has a light incident surface 22 facing the light source. The light from the light source enters inside the light guide member 20 from the light incident surface 22 of the light guide member 20, as indicated by the arrow Li in FIGS. 1A and 1B and propagates in a direction (the x direction) along the main surfaces 24a and 24b, that is, a propagation direction P. The light is emitted from the main surface 24a of the light guide member 20 in the direction perpendicular to the main surfaces 24a and 24b (the z direction indicated by the allow Lo in FIG. 1B) in the course of propagation through the light guide member 20 in the propagation direction P. Note that the main surfaces 24a and 24b may referred to as first and second main surfaces 24a and 24b, respectively, in the following discussion in the present description.

The diffusing member 30 is provided on at least one of the first and second main surfaces 24a and 24b of the light guide member 20. In the light guide plate 100 illustrated in FIG. 1B, the diffusing member 30 is provided on the main surface 24a of the light guide member 20. The diffusing member 30 may be made of the same material as the light guide member 20 or a material different from that of the light guide member 20. Where the diffusing member 30 is made of a material different from that of the light guide member 20, the refractive index changes at the interface between the main surface 24a of the light guide member 20 and the diffusing member 30.

The diffusing member 30 may be made of an acrylic resin or a polyimide resin, for example. Alternatively, the diffusing member 30 may contain beads. For example, the beads may be made of amorphous silica or acryl and have an average grain diameter of about 1 µm.

The light incident to the recessed surfaces of the recesses 31 of the diffusing member 30 is diffused at the recessed surfaces of the recesses 31 of the diffusing member 30. The light incident to the recessed surfaces of the recesses 31 of the diffusing member 30 may include light entering the diffusing member 30 and then arriving at the recessed surfaces in addition to light being reflected in the light guide member 20 and then arriving at the recessed surfaces.

The recesses 31 are aligned in the propagation direction P. Specifically, the central parts of the recesses 31 are linearly aligned almost in the propagation direction P when viewing the main surface 24a of the light guide member 20 in the normal direction.

For example, the length (width) in the x direction and the length (width) in the y direction of each recess 31 may be 20 µm to 70 µm, respectively. Further, the depth (length in the z direction) of each recess 31 may be 5 µm, for example. As will be described later in detail, such micro recesses 31 can be formed suitably by gravure offset printing. The micro recesses 31 can diffuse light appropriately. Where a light guide plate is employed in a liquid crystal display device, a diffuser plate is provided typically for light diffusion. However, formation of the recesses 31 that can appropriately diffuse light can eliminate the need of the diffuser plate in the liquid crystal display device.

As has been described so far with reference to FIGS. 1A and 1B, the light guide plate 100 diffuses light at the recesses 31 of the diffusing member 30. As such, a part that diffuses light does not protrude. This can prevent damage to the part that diffuses light. Thus, reduction in light uniformity can be prevented.

[Second Embodiment of Light Guide Plate]

Figure 2:
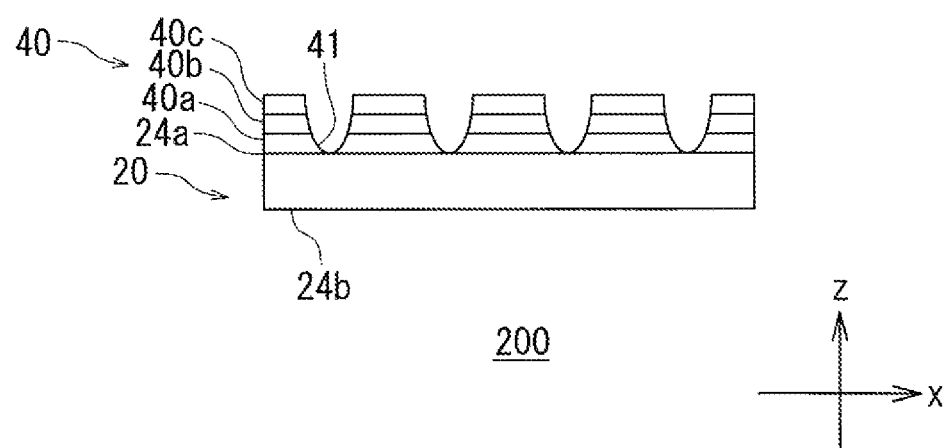
FIG. 2 is a schematic illustration illustrating a light guide plate according to another embodiment of the present invention.

FIG. 2 is a schematic illustration illustrating a light guide plate 200 according to another embodiment of the present invention. The light guide plate 200 includes the light guide member 20 and a diffusing member 40. The diffusing member 40 is formed of a plurality of layers including a first layer 40a, a second layer 40b, and a third layer 40c. The light guide plate 200 has a similar configuration to that of the light guide plate 100 discussed with reference to FIGS. 1A and 1B except the diffusing member 40 being formed of a plurality of layers. Therefore, duplicate description may be omitted.

The second layer 40b is formed on the first layer 40a. The third layer 40c is formed on the second layer 40b. Each of the first, second, and third layers 40a, 40b, and 40c has a plurality of openings. The openings of the first layer 40a, the openings of the second layer 40b, and the openings of the third layer 40c are aligned to form a plurality of recesses 41.

The first, second, and third layers may be made of the same material. Alternatively, any of the layers may be made of a different material. For example, the first layer 40a may be made of the same material as the light guide member 20, that is, an acrylic resin such as poly methyl methacrylate resin (PPMA). The second layer 40b may be made of an acrylic based ink with which glass frit, bubbles, or the like is/are mixed. The third layer 40c may be made of a material having a reflectivity and a refracting angle different from those of the light guide member 20. The use of the acrylic based ink with which glass frit, bubbles, or the like is/are mixed as the material of the diffusing member 40 can readily cause diffuse-reflection of the incident light, thereby achieving light diffusion. The use of the materials having different reflectivities and refracting angles for the diffusing member 40 can increase reflection efficiency.

As has been described with reference to FIG. 2, the diffusing member 40 of the light guide plate 200 is formed of a plurality of layers. This means formation of a diffusing member made of different materials. Thus, the degree of freedom of selection increases among combinations of materials for the diffusing member.

[Third Embodiment of Light Guide Plate]

Figure 3A:
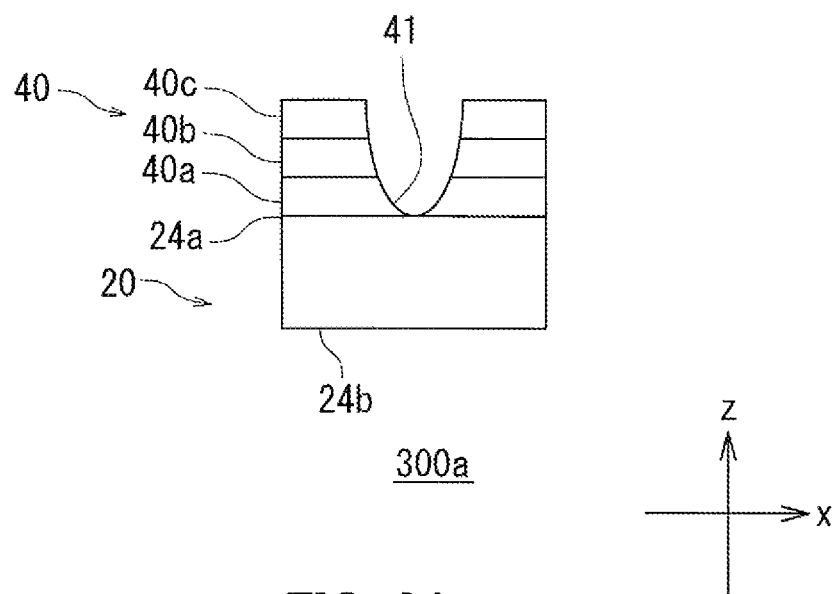
FIGS. 3A and 3B are schematic illustrations illustrating light guide plates according to still another embodiment of the present invention.
Figure 3B:
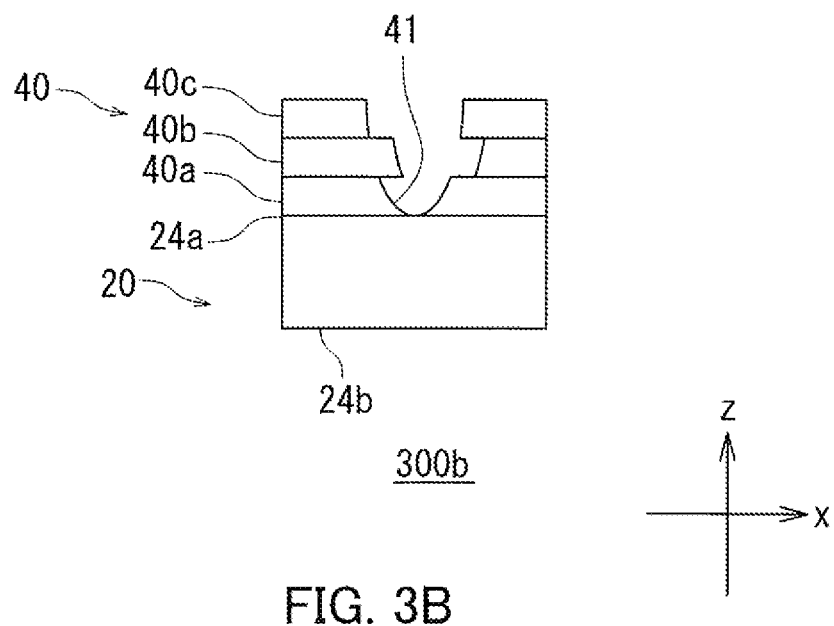

FIGS. 3A and 3B are schematic illustrations illustrating light guide plates 300a and 300b according to still another embodiment of the present invention. FIG. 3A illustrates the light guide plate 300a in which each recess of the diffusing member 40 has a recessed surface with no projection and depression. FIG. 3B illustrates the light guide plate 300b in which each recess of the diffusing member 40 has a recessed surface with a projection and a depression. The light guide plate 300a has a similar configuration to that of the light guide plate 200 described with reference to FIG. 2. Therefore, duplicate description may be omitted. The light guide plate 300b has a similar configuration to that of the light guide plate 200 discussed with reference to FIG. 2 except each recess of the diffusing member 40 having a recessed surface with a projection and a depression. Therefore, duplicate description may be omitted.

The light guide plate 300b includes the light guide member 20 and the diffusing member 40. Each recess 41 of the diffusing member 40 has a recessed surface with a projection and a depression. The second layer 40b is layered in a displaced manner from the first and third layers 40a and 40c. With the projection and the depression on the recessed surface of each recess 41 of the diffusing member 40, light can be diffuse-reflected. The greater the widths of the projection and the depression are, the more the light can be diffuse-reflected. Therefore, it is preferable to set the widths of the projection and the depression to be wider. However, the outlet of the light should not be closed. For example, where the opening of each recess has a diameter of 20 µm, the widths of the projection and the depression may be 0 µm to 10 µm. For example, where the opening of each recess has a diameter of 70 µm, the widths of the projection and the depression may be 0 µm to 35 µm.

Note that projections and depressions may be formed on all over the main surface 24a of the light guide member 20 prior to printing an ink for formation of the diffusing member 40. Formation of the projections and the depressions on and in all over the main surface 24a of the light guide member 20 can result in formation a projection and a depression on and in the bottom of the recessed surface of each recess 41. The thickness of the projection and the depression on and in the bottom may be 0.5 nm to 10 µm, for example. Where the projection and the depression are formed on the bottom by, for example, gravure offset printing, the thickness thereof may be 2 µm. The projections and the depressions on and in the bottom of the recessed surface can diffuse-reflect light even at the bottom of each recess 41. Thus, light can diffuse.

As has been described with reference to FIG. 3B, the projection and the depression are formed on and in the recessed surface of each recess 41 of the diffusing member 40 of the light guide plate 300b. This can cause diffuse-reflection of light. As a result, light can diffuse, thereby increasing diffusion efficiency of the light guide plate.

[Fourth Embodiment of Light Guide Plate]

Figure 4A:
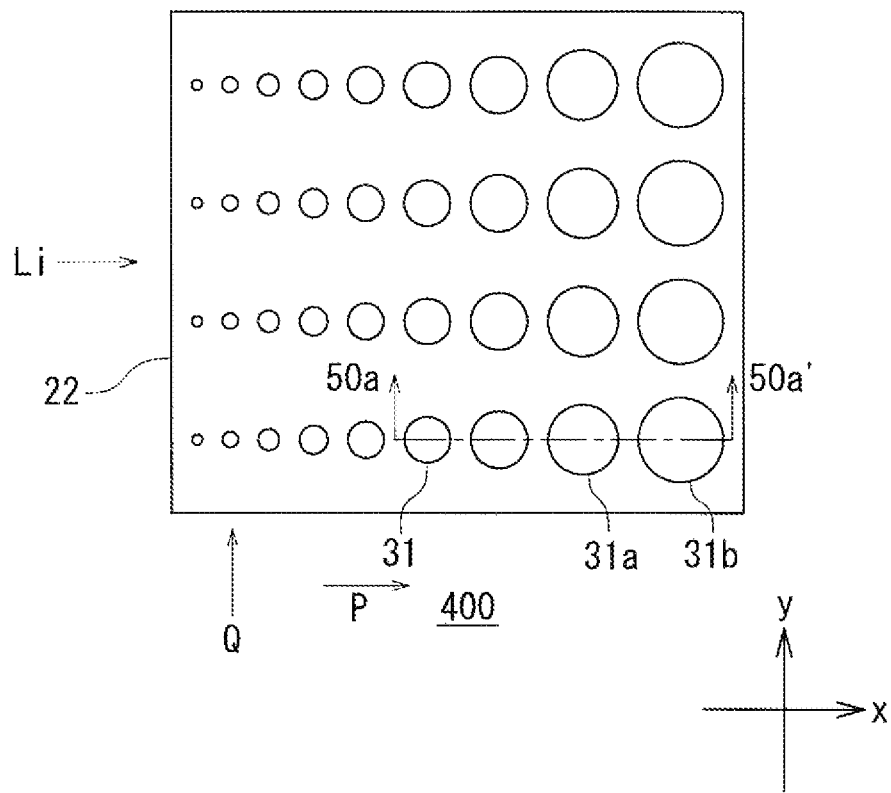
FIGS. 4A and 4B are schematic illustrations illustrating a light guide plate in yet another embodiment of the present invention.
Figure 4B:
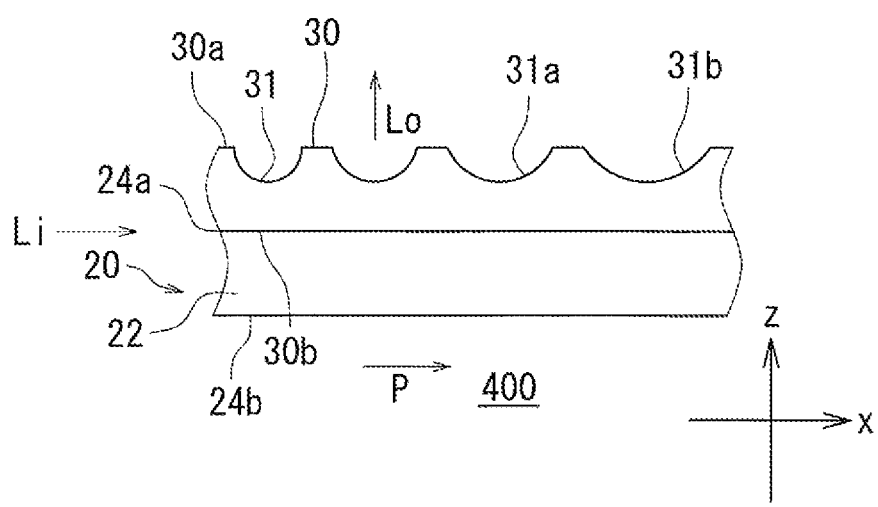

FIGS. 4A and 4B are schematic illustrations illustrating a light guide plate 400 according to yet another embodiment of the present invention. FIG. 4A is a top view of the light guide plate 400. FIG. 4B is a cross sectional view taken along the line 50a-50a' of the light guide plate 400.

The light guide plate 400 includes the light guide member 20 and a diffusing member 30. The diffusing member 30 has two main surfaces 30a and 30b. A plurality of recesses 31 are formed in one 30a of the two main surfaces 30a and 30b of the diffusing member 30 that is opposite to the main surface 30b next to the light guide member 20. The light guide plate 400 has a similar configuration to that of the light guide plate 100 described with reference to FIG. 1 except the size of the recesses 31 being changed with the distance from the light incident surface 22. Therefore, duplicate description may be omitted.

In the light guide plate 400, the size of the recesses 31 differs according to the distance from the light incident surface 22. The recesses 31 are arranged such that their size increases with the distance away from the light incident surface 22 when viewing the main surface 24a in the normal direction. In a typical light guide plate, the longer the propagation length is, the more the light incident to the light incident surface is reflected in the light guide plate to be dampened. Accordingly, the more the distance from the light incident surface increases, the more the intensity of the light diffused in the light guide plate decreases. By contrast, in the light guide plate 400 of the present embodiment, the recesses 31 are arranged such that their size increases with the distance away from the light incident surface 22. Accordingly, reflection efficiency increases with the distance away from the light incident surface 22. While the amount of the light arriving at the recesses 31 decreases with the distance away from the light incident surface 22, the intensity of the light from the light guide plate 400 can be uniformed.

The focus will now be placed upon adjacent two recesses (recesses 31a and 31b) aligned along the same straight line (on a straight line in the x direction). When viewing the main surface 24a of the light guide member 20 in the normal direction, the distance between the recess 31b and the light incident surface 22 is greater than that between the recess 31a and the light incident surface 22. Here, the recesses 31a and 31b are circular in shape. Note that the recesses 31a and 31b may be referred to as first and second recesses 31a and 31b, respectively, in the following discussion in the present description.

As described with reference to FIGS. 4A and 4B, the recesses 31a and 31b are arranged such that the centers of the recesses 31a and 31b are aligned in the propagation direction P of the light entering the light incident surface 22. When the main surface 24a of the light guide member 20 is viewed in the normal direction, the second recess 31b is larger than the first recess 31a. In other words, in the light guide plate 400 of the present embodiment, the size of the recesses 31 is increased with the distance away from the light incident surface 22 when viewing not only the main surface 24a entirely but also the vicinity of each recess 31 locally. Thus, further uniform intensity of the light from the light guide plate 400 can be obtained. In the light guide plate 400 of the present embodiment, the size of the recesses 31 is increased with the distance away from the light incident surface 22 to increase diffusion efficiency.

Figure 5A:
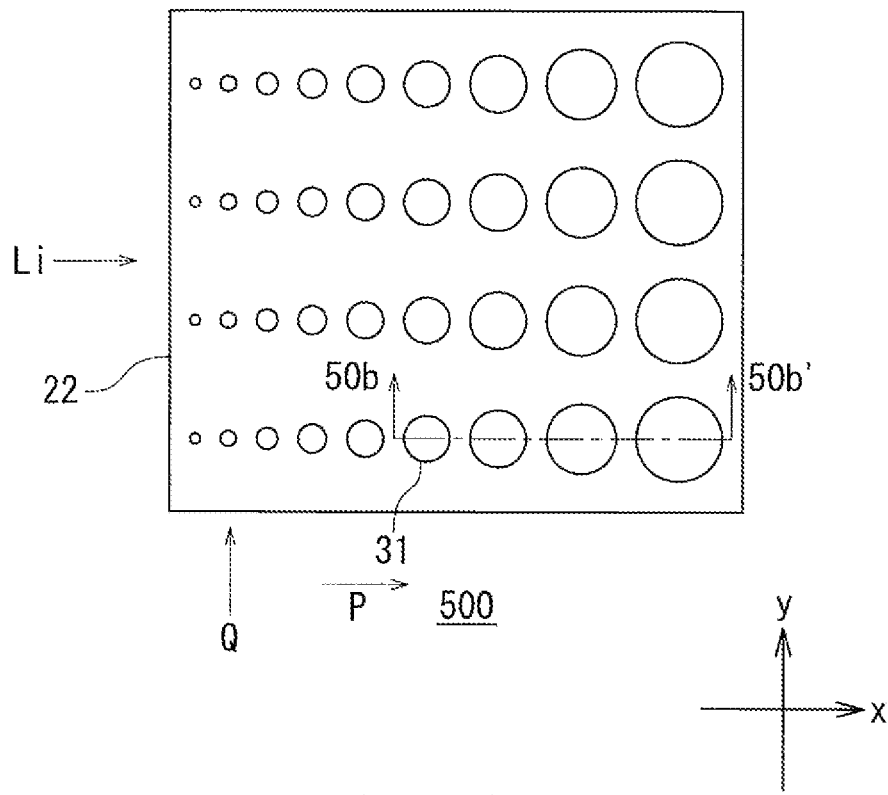
FIGS. 5A and 5B are schematic illustrations illustrating a light guide plate in still another embodiment of the present invention.
Figure 5B:
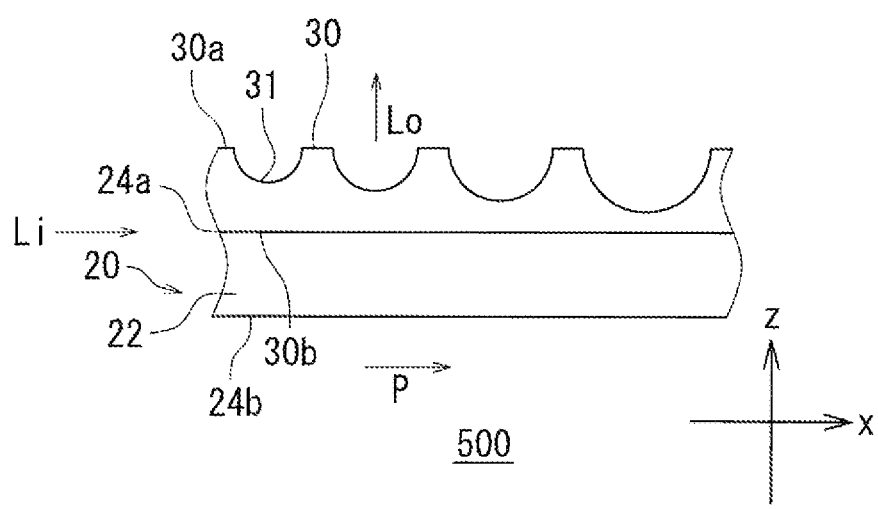

FIGS. 5A and 5B are schematic illustrations illustrating a light guide plate 500 according to yet another embodiment of the present invention. FIG. 5A is a top view of the light guide plate 500. FIG. 5B is a cross sectional view taken along the line 50b-50b' of the light guide plate 500.

The light guide plate 500 includes the light guide member 20 and a diffusing member 30. The diffusing member 30 includes two main surfaces 30a and 30b. A plurality of recesses 31 are formed in one 30a of the two main surfaces 30a and 30b of the diffusing member 30 that is opposite to the main surface 30b next to the light guide member 20. The light guide plate 500 has a similar configuration to that of the light guide plate 400 described with reference to FIGS. 4A and 4B except the depth (the length in the z direction) of the recesses 31 differing according to the distance from the light incident surface 22. Therefore, duplicate description may be omitted.

The depth (the length in the z direction) of the recesses 31 differs according to the distance from the light incident surface 22 in the light guide plate 500 of the present embodiment. The recesses 31 are arranged such that the depth (the length in the z direction) increases with the distance away from the light incident surface 22. For example, the depth of the recesses 31 may be increased from 1 μm to 2 μm, to 3 μm, and to 4 μm with the distance away from the light incident surface 22.

[Fifth Embodiment of Light Guide Plate]

Figure 6:
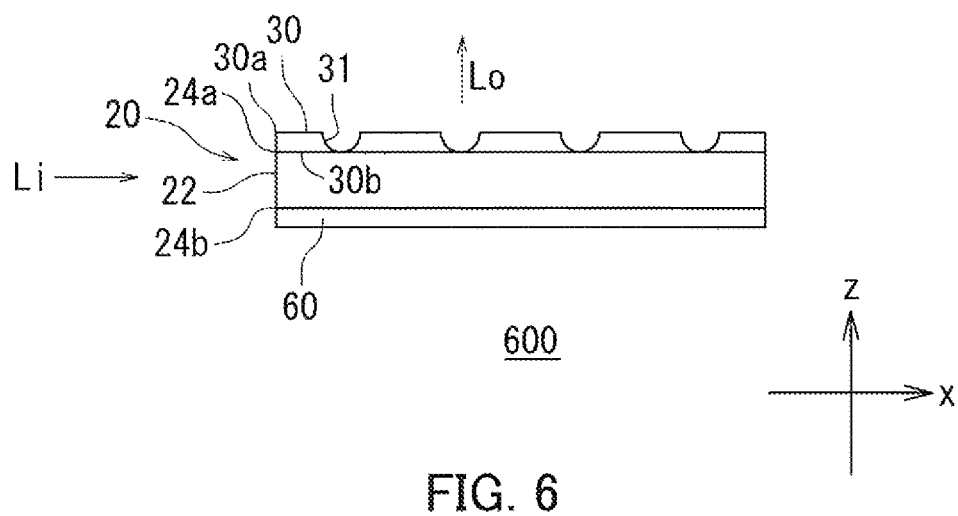
FIG. 6 is a schematic illustration illustrating a light guide plate in yet another embodiment of the present invention.

FIG. 6 is a schematic illustration of a light guide plate 600 according to still another embodiment of the present invention. The light guide plate 600 includes the light guide member 20, the diffusing member 30, and a reflective film 60. The light guide plate 600 has a similar configuration to that of the light guide plate 100 discussed with reference to FIGS. 1A and 1B except inclusion of the reflective film 60. Therefore, duplicate description may be omitted.

The light guide member 20 has two main surfaces, a main surface 24a next to the diffusing member 30 and a main surface 24b opposite to the main surface 24a. The light guide plate 600 includes the reflective film 60 on the main surface 24b. That is, the reflective film is provided on the main surface 24b on the opposite side to the light emitting direction Lo in the light guide plate 600. The reflective film 60 reflects light arriving at the main surface 24b. The reflective film is a white sheet formed by adding titanium oxide to an aromatic polyester based resin, for example. The thickness of the reflective film 60 may be 15 μm to 25 μm, for example, but can be about 200 μm. The reflective film 60 can reflect light leaking from the main surface 24b. This can increase use efficiency.

Traditional light guide plates emit light from a main surface opposite to another main surface on which a dot pattern is formed. For this reason, a reflective film is needed to be formed on the main surface on which the dot pattern is formed. However, the dot pattern protrudes, and therefore, an air layer is needed to be formed between the dot pattern and the reflective film. By contrast, in the light guide plate 600, the light is emitted in the light emitting direction Lo from the main surface 24a on which the diffusing member is formed. Accordingly, the reflective film can be formed on the main surface 24b. As such, the reflective film 60 can be formed on the flat surface, thereby eliminating the need of an air layer. Further, the reflective film 60 is formed on the main surface opposite to the diffusing member. This can reduce damage on the diffusing member by contact between the reflective film 60 and the diffusing member 30. With no air layer, no light loss for the presence of an air layer may be caused, thereby enabling an increase in light emitting efficiency. The reflective film 60 that is formed on the flat surface can be formed by printing.

[First Embodiment of Light Source Device]

Figure 7:
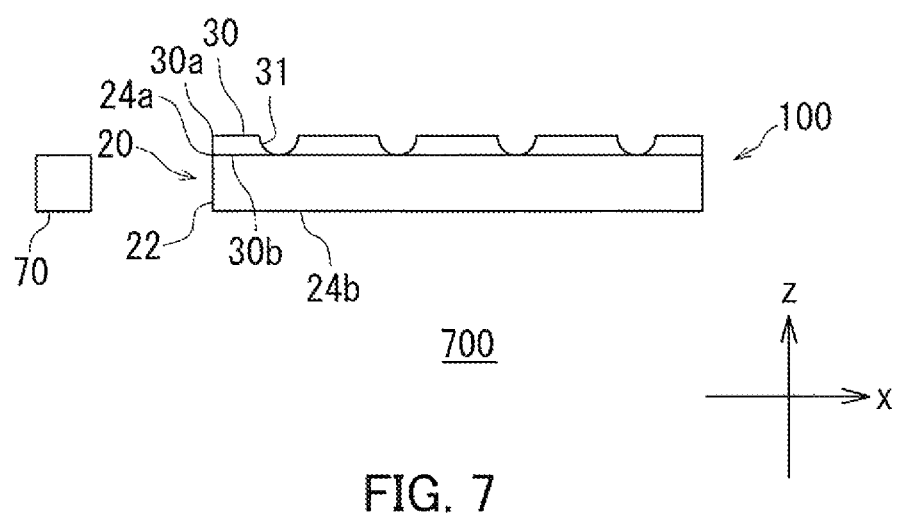
FIG. 7 is a schematic illustration illustrating a light source device according to an embodiment of the present invention.

FIG. 7 is a schematic illustration illustrating a light source device 700 according to an embodiment of the present invention. The light source device 700 includes a light guide plate 100 and a light source 70. The light guide plate 100 has a similar configuration to that of the light guide plate 100 described with reference to FIGS. 1A and 1B. Therefore, duplicate description may be omitted. The light source 70 is provided to face a light incident surface 22 of the light guide plate 100. The light source 70 emits light that is to enter the light guide member 20. The light source device 700 can be used as a lighting device.

[First Embodiment of Light Guide Plate Manufacturing Apparatus]

Figure 8:
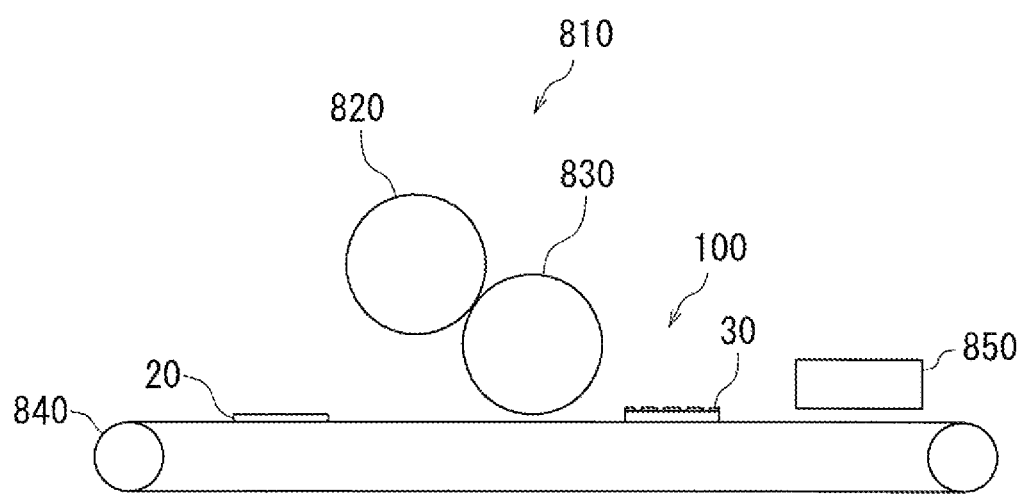
FIG. 8 is a schematic illustration illustrating a light guide plate manufacturing apparatus according to an embodiment of the present invention.
Figure 9A:
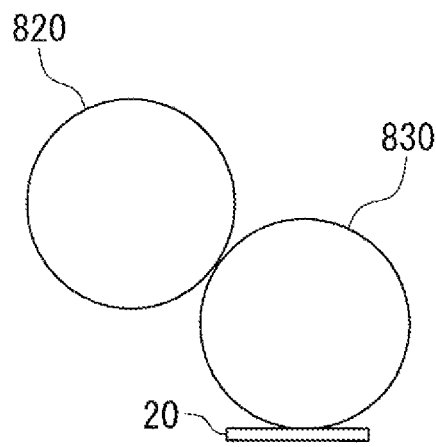
FIG. 9A is a schematic illustration illustrating a printing section of the light guide plate manufacturing apparatus according to the embodiment of the present invention.
Figure 9B:
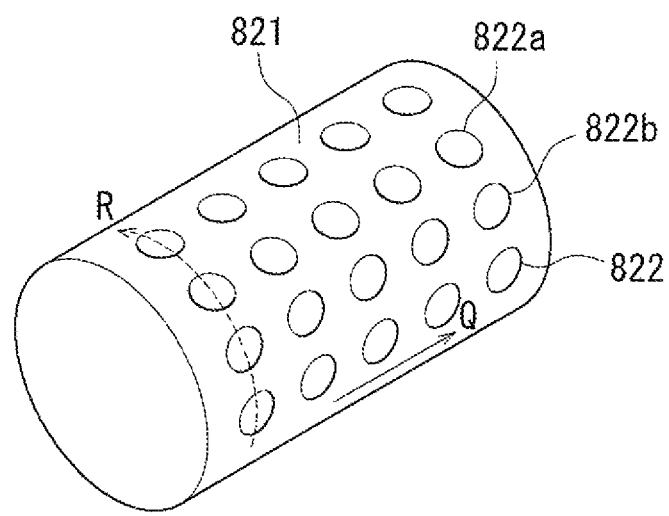
FIG. 9B is a schematic illustration illustrating a pattern roll of the light guide plate manufacturing apparatus.

An embodiment of a light guide plate manufacturing apparatus 800 according to the present invention will be described below with reference to FIGS. 8, 9A, and 9B. FIG. 8 is a schematic illustration illustrating the light guide plate manufacturing apparatus 800 according to the embodiment of the present invention. FIG. 9A is a schematic illustration illustrating a printing section 810. FIG. 9B is a schematic illustration illustrating a pattern roll 820. The light guide plate manufacturing apparatus 800 manufactures the light guide plate 100 described with reference to FIGS. 1A and 1B. The light guide plate manufacturing apparatus 800 may be referred to simply as a manufacturing apparatus 800 in the following discussion.

The manufacturing apparatus 800 includes the printing section 810. The printing section 810 includes the pattern roll 820 and a transfer roll 830. The printing section 810 prints an ink for formation of the diffusing member 30 on the light guide member 20. The pattern roll 820 and the transfer roll 830 are rotatable. Here, the pattern roll 820 has a diameter almost equal to that of the transfer roll 830.

The surface of the pattern roll 820 is subjected to metal plating. Typically, grooves in a predetermined pattern are formed in the pattern roll 820. The pattern corresponds to lines, figures, designs, etc. to be printed on the light guide member 20. The transfer roll 830 includes a metal cylinder and a blanket. The blanket is provided to cover the outer circumferential surface of the metal cylinder. Typically, the blanket may be made of a rubber. For example, the blanket may be made of silicon rubber. The metal cylinder may be made of iron or aluminum, for example.

On the surface of the pattern roll 820, an ink charging portion 821 and a plurality of protrusions 822 are formed. The shape of the protrusions 822 corresponds to that of the recesses 31 of the diffusing member 30 (FIG. 9B). The focus will now be placed upon adjacent two protrusions 822a and 822b. The protrusions 822a and 822b may be referred to as first and second protrusions 822a and 822b, respectively, in the following discussion in the present description. The first and second protrusions 822a and 822b are aligned in a direction R that is the rotation direction of the pattern roll 820.

Note that the direction R in which the protrusions 822a and 822b are linearly aligned accords with the rotation direction of the pattern roll 820 in FIG. 9B, which however should not be taken to limit the present invention. The direction R may be the direction of the generatrix of the cylindrical pattern roll 820.

The light guide member 20 is preferably conveyed up to under the pattern roll 820 and the transfer roll 830 in the manufacturing apparatus 800. For example, the manufacturing apparatus 800 further includes a conveyance section 840 that conveys the light guide member 20, as illustrated in FIG. 8. Here, the conveyance section 840 is a conveyor. The conveyance section 840 conveys the light guide member 20 to the pattern roll 820 and the transfer roll 830 that are fixed. The manufacturing apparatus 800 may further include a dryer 850 to dry an ink.

[First Embodiment of Method for Manufacturing Light Guide Plate]

Figure 10A:
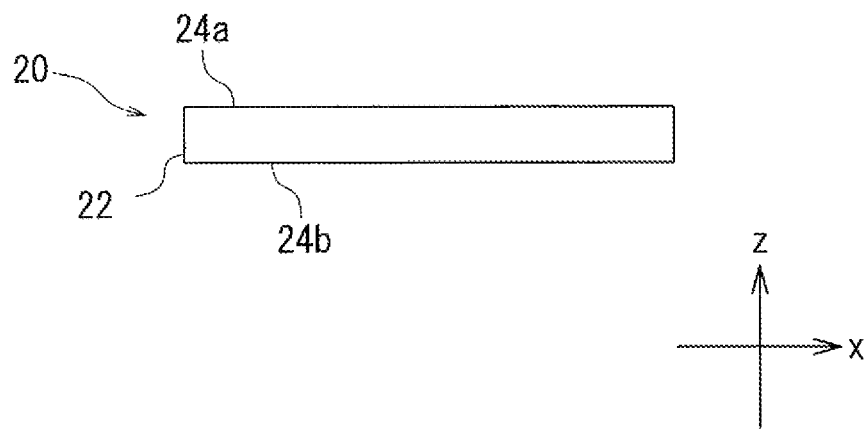
FIGS. 10A and 10B are schematic illustrations for explaining a method for manufacturing a light guide plate according to the present invention.
Figure 10B:
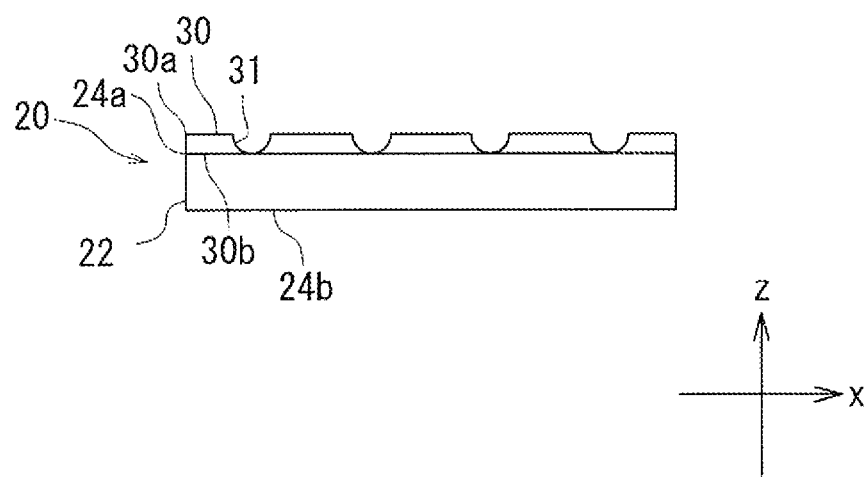

FIGS. 10A and 10B are schematic illustrations for explaining a method for manufacturing a light guide plate according to the present invention. With reference to FIGS. 8-10B, one example of a method for manufacturing a light guide plate 100 will be described below. First, as illustrated in FIG. 10A, a light guide member 20 is prepared that has a light incident surface 22 and main surfaces 24a and 24b.

As shown in FIG. 10B, an ink for formation of a diffusing member 30 is printed on the main surface 24a of the light guide member 20. A plurality of recesses 31 are formed in a main surface 30a of the diffusing member 30 that is opposite to a main surface 30b next to the light guide member 20. The ink for formation of the diffusing member 30 is printed on the main surface 24a of the light guide member 20 herein. However, the ink for formation of the diffusing member 30 may be printed on the main surface 24b or both of the main surfaces 24a and 24b of the light guide member 20.

Typically, the light guide member 20 is made of an acrylic resin such as poly methyl methacrylate resin (PPMA). Further, the pattern roll 820 is typically made of a metal, and the blanket of the transfer roll 830 is made of a resin in the manufacturing apparatus 800. Accordingly, the blanket of the transfer roll 830 rather than the pattern roll 820 comes in direct contact with the light guide member 20 in the manufacturing apparatus 800. Thus, physical impact on the acrylic resin can be reduced.

As described above, it is preferable to manufacture the light guide plate 100 by gravure offset printing. Gravure offset printing can reduce the amount of use of the material of the diffusing member 30 and form the diffusing member 30 simply at high speed. Further, gravure offset printing can form the micro recesses 31 and form the diffusing member 30 with a material different from that of the light guide member 20. Note that it is preferable to form the diffusing member 30 with almost the same material as that of the light guide member 20 even in gravure offset printing.

[Second Embodiment of Light Guide Plate Manufacturing Apparatus]

Figure 11:
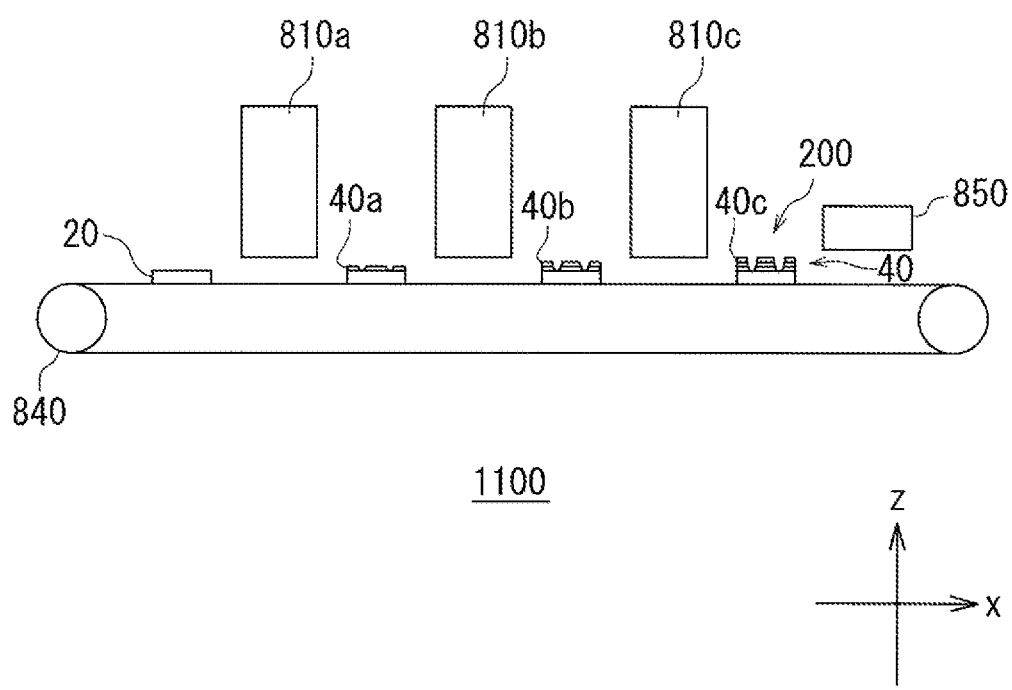
FIG. 11 is a schematic illustration illustrating a light guide plate manufacturing apparatus according to another embodiment of the present invention.

FIG. 11 is a schematic illustration illustrating a light guide plate manufacturing apparatus 1100 according to another embodiment of the present invention. The light guide plate manufacturing apparatus 1100 manufactures the light guide plate 200 described with reference to FIG. 2. The light guide plate manufacturing apparatus 1100 includes a first printing section 810a, a second printing section 810b, and a third printing section 810c. The light guide plate manufacturing apparatus 1100 has a similar configuration to that of the light guide plate manufacturing apparatus 800 described with reference to FIG. 8 except inclusion of a plurality of printing sections. Therefore, duplicate description may be omitted. The light guide plate manufacturing apparatus 1100 may be referred to simply as a manufacturing apparatus 1100 in the following discussion.

The manufacturing apparatus 1100 includes a plurality of printing sections. The first printing section 810a includes a first transfer roll and a first pattern roll having a pattern corresponding to the shape of the first layer 40a of the diffusing member 40. The second printing section 810b includes a second transfer roll and a second pattern roll having a pattern corresponding to the shape of the second layer 40b of the diffusing member 40. The third printing section 810c includes a third transfer roll and a third pattern roll having a pattern corresponding to the shape of the third layer 40c of the diffusing member 40. On each of the first to third pattern rolls, an ink charging portion and a plurality of protrusions having a shape corresponding to that of the recesses of the diffusing member are formed.

[Second Embodiment of Method for Manufacturing Light Guide Plate]

With reference to FIG. 11, one example of a method for manufacturing a light guide plate 200 will be described below. The method for manufacturing the light guide plate 200 includes first, second, and third steps. First, a light guide member 20 is placed on the conveyance section 840. The conveyance section 840 conveys the light guide member 20. Next, once the light guide member 20 conveyed by the conveyance section 840 comes under the first printing section 810a, the first printing section 810a prints an ink for formation of a first layer 40a of a diffusing member 40 to layer the ink on the light guide member 20 (first step). When the light guide member 20 comes under the second printing section 810b after printing by the first printing section 810a, the second printing section 810b prints an ink for formation of a second layer 40b of the diffusing member 40 to layer the ink on the first layer 40a (second step). Then, when the light guide member 20 comes under the third printing section 810c after printing by the second printing section 810b, the third printing section 810c prints an ink for formation of a third layer 40c of the diffusing member 40 to layer the ink on the second layer 40b (third step). Through the first to third steps described above, the light guide plate 200 can be formed from the light guide member 20.

[Third Embodiment of Light Guide Plate Manufacturing Apparatus]

Figure 12A:
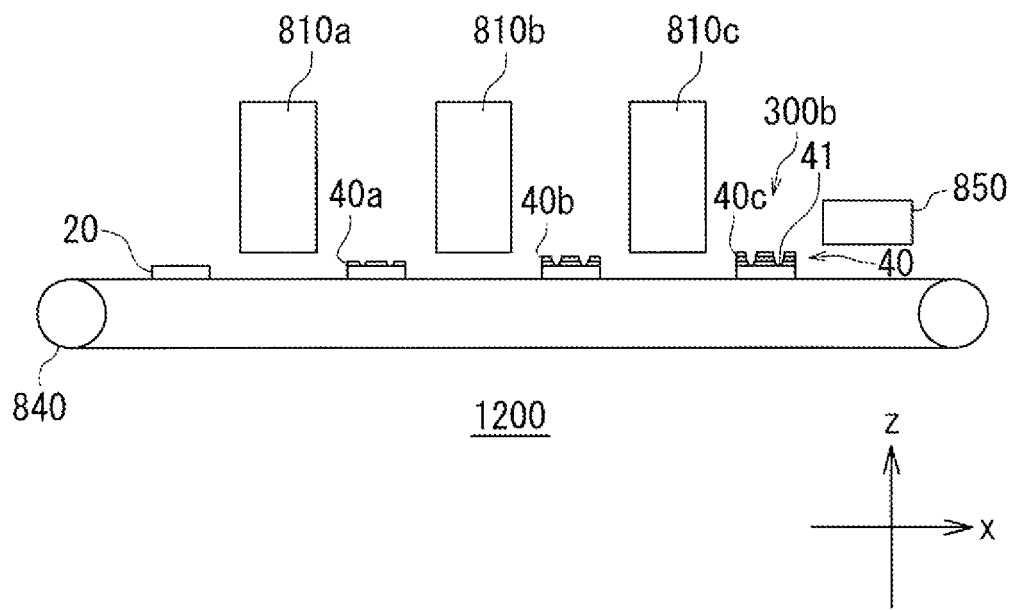
FIGS. 12A and 12B are schematic illustrations illustrating a light guide plate manufacturing apparatus according to yet another embodiment of the present invention.
Figure 12B:
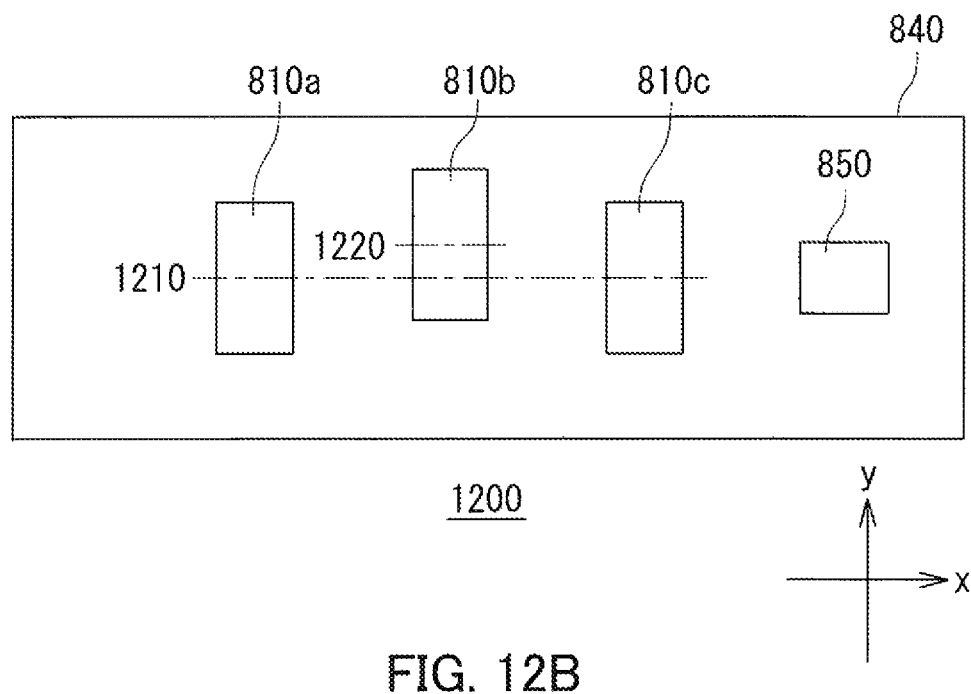

FIG. 12A is a schematic illustration illustrating a light guide plate manufacturing apparatus 1200 according to still another embodiment of the present invention. FIG. 12B is a schematic top view of the light guide plate manufacturing apparatus 1200 according to the embodiment of the present invention. The light guide plate manufacturing apparatus 1200 manufactures the light guide plate 300b described with reference to FIG. 3B. The light guide plate manufacturing apparatus 1200 has a similar configuration to that of the light guide plate manufacturing apparatus 1100 described with reference to FIG. 11 except the second printing section 810b being provided so as to print the second layer 40b of the diffusing member 40 in a displaced manner from the first layer 40a. Therefore, duplicate description may be omitted. The light guide plate manufacturing apparatus 1200 may be referred to simply as a manufacturing apparatus 1200 in the following discussion.

The manufacturing apparatus 1200 includes a plurality of printing sections. The light guide plate manufacturing apparatus 1200 includes a first printing section 810a, a second printing section 810b, and a third printing section 810c. In FIG. 12B, a center line 1210 indicates the center line passing through each center of the first printing section 810a and the third printing section 810c. A center line 1220 indicates the center line passing through the center of the second printing section 810b. The second printing section 810b is arranged in a displaced manner from the center line 1210 in the y direction. When the second printing section 810b is arranged to be displaced from the center line 1210 in the y direction, the second layer 40b of the diffusing member 40 is printed in a displaced manner from the first and third layers 40a and 40c in the y direction. As a result, the light guide plate 300b can be manufactured in which each recess 41 of the diffusing member has a projection and a depression.

[Fourth Embodiment of Light Guide Plate Manufacturing Apparatus]

Figure 13:
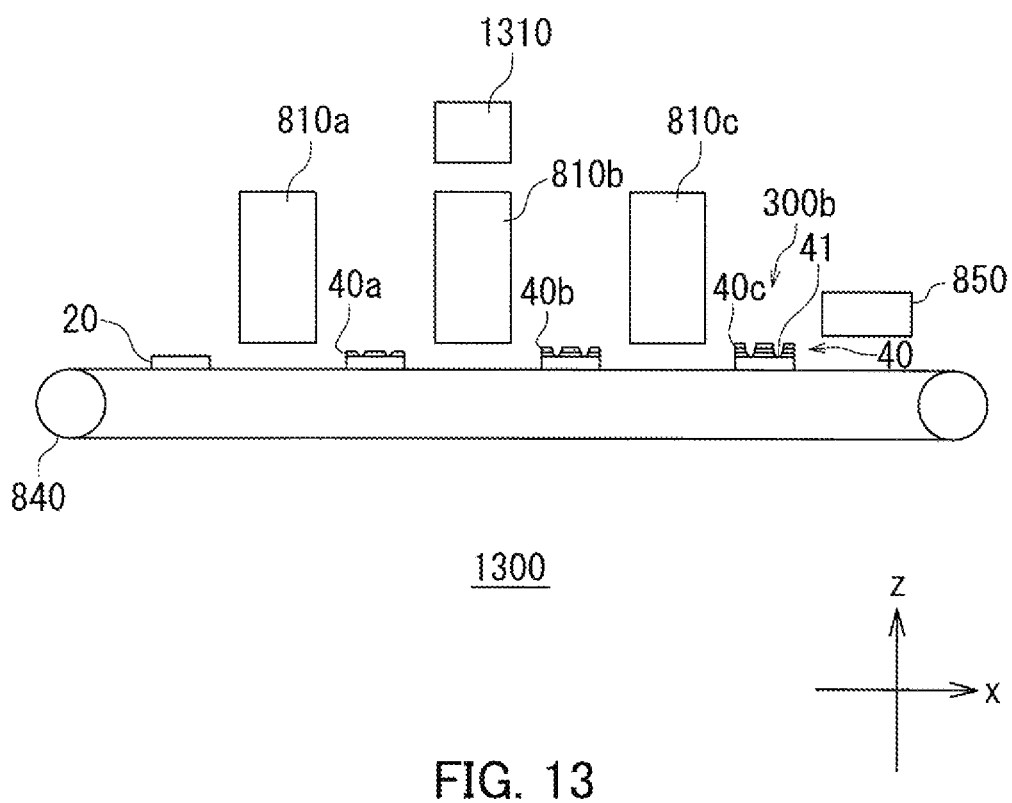
FIG. 13 is a schematic illustration illustrating a light guide plate manufacturing apparatus according to still another embodiment of the present invention.

FIG. 13 is a schematic illustration illustrating a light guide plate manufacturing apparatus 1300 according to yet another embodiment of the present invention. The light guide plate manufacturing apparatus 1300 manufactures the light guide plate 300b described with reference to FIG. 3B. The light guide plate manufacturing apparatus 1300 has a similar configuration to that of the light guide plate manufacturing apparatus 1100 described with reference to FIG. 11 except inclusion of a timing adjusting means 1310. Therefore, duplicate description may be omitted. The light guide plate manufacturing apparatus 1300 may be referred to simply as a manufacturing apparatus 1300 in the following discussion.

The manufacturing apparatus 1300 additionally includes a timing adjusting means 1310. The timing adjusting means 1310 adjusts timing of printing of the second layer 40b of the diffusing member 40 such that the second layer 40b is printed in a displaced manner from the first layer 40a. Where the transfer roll of the first printing section 810a and the transfer roll of the second printing section 810b rotate at the same rotational speed, for example, the printing start point of the transfer roll of the second printing section 810b is displaced from that of the transfer roll of the first printing section 810a so that the second layer 40b of the diffusing member 40 is printed in a displaced manner from the first layer 40a. Alternatively, the rotational speed of the transfer roll of the second printing section 810b is adjusted so that the second layer 40b of the diffusing member 40 is printed in a displaced manner from the first layer 40a. For example, the location of the first layer 41a of the diffusing member 40 printed on the light guide member 20 is measured after the first layer 40a is printed. Then, the rotational speed of the transfer roll is adjusted according to the measured location of the first layer 40a.

[Fifth Embodiment of Light Guide Plate Manufacturing Apparatus]

Figure 14:
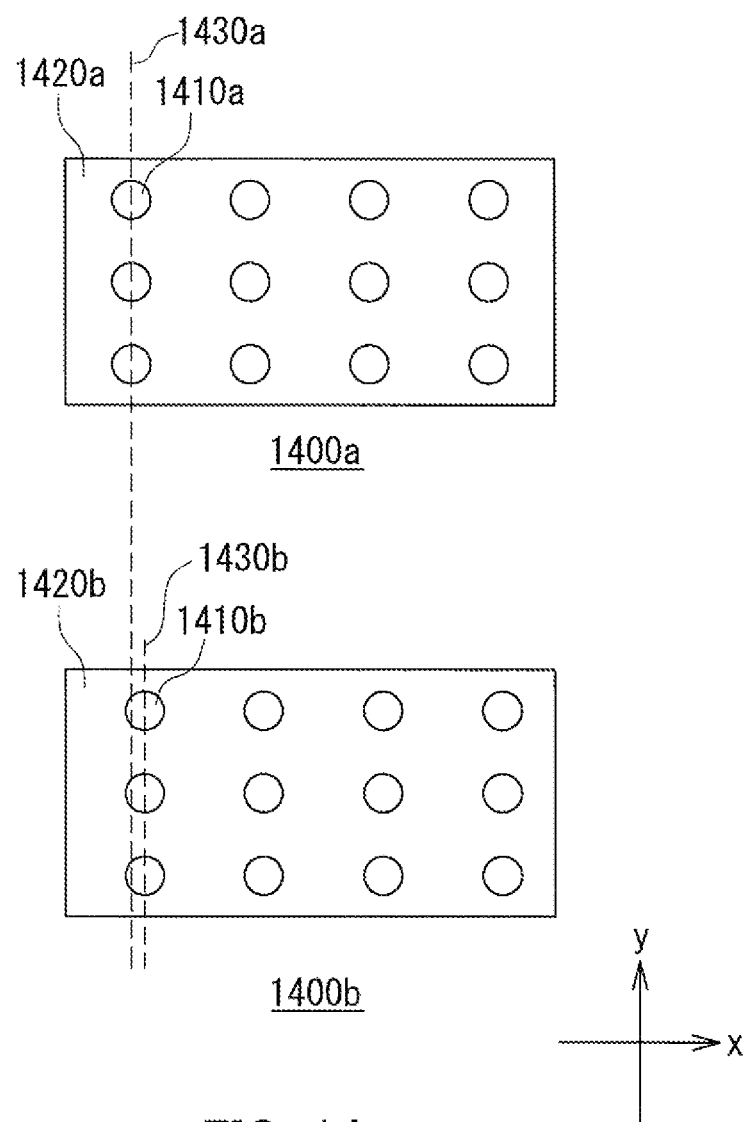
FIG. 14 is a development view of a pattern roll of a light guide plate manufacturing apparatus according to another embodiment of the present invention.

FIG. 14 is a development view of pattern rolls of a light guide plate manufacturing apparatus according to yet another embodiment of the present invention. The upper part of FIG. 14 corresponds to a development view of a first pattern roll 1400a. The lower part of FIG. 14 corresponds to a development view of a second pattern roll 1400b.

The first pattern roll 1400a includes a plurality of protrusions 1410a and an ink charging portion 1420a. The second pattern roll 1400b includes a plurality of protrusions 1410b and an ink charging portion 1420b. A center line 1430a indicates each center line of respective protrusions 1410a. A center line 1430b indicates each center line of respective protrusions 1410b. The center line 1430b is displaced from the center line 1430a in the x direction. The protrusions 1410b of the second pattern roll 1400b are displaced from the corresponding protrusions 1410a of the first pattern roll 1400a in a predetermined direction. This can result in printing of the second layer 40b in a displaced manner from the first layer 40a. Thus, the light guide plate 300b described with reference to FIG. 3B can be manufactured. The second pattern roll 1400b is displaced from the first pattern roll 1400a in the x direction but may be displaced from the first pattern roll 1400a in the y direction.

[Sixth Embodiment of Light Guide Plate Manufacturing Apparatus]

Figure 15:
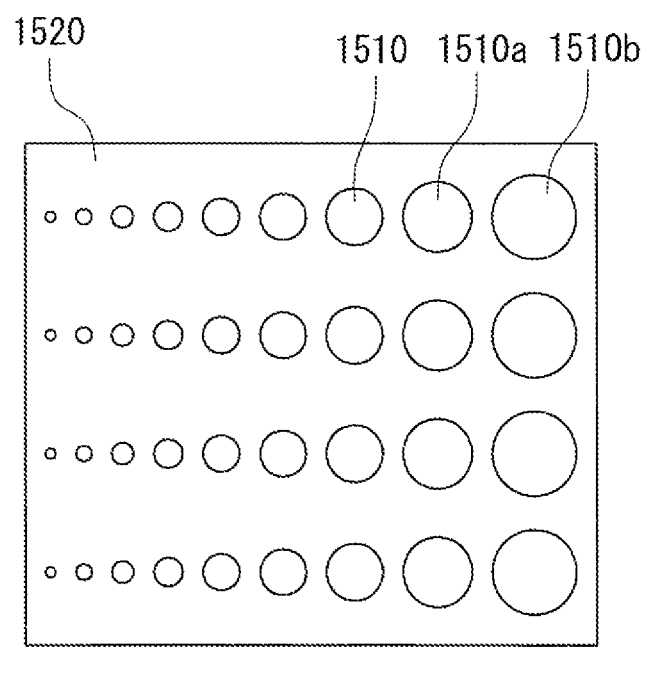
FIG. 15 is a development view of a pattern roll of a light guide plate manufacturing apparatus according to yet another embodiment of the present invention.

FIG. 15 is a development view of a pattern roll 1500 of a light guide plate manufacturing apparatus according to still another embodiment of the present invention.

The pattern roll 1500 includes a plurality of protrusions 1510 including a first protrusion 1510*a* and a second protrusion 1510*b* and an ink charging portion 1520. The first and second protrusions 1510*a* and 1510*b* are aligned in the x direction. The second protrusion 1510*b* is larger than the first protrusion 1510*a*. The use of the pattern roll 1500 can manufacture the light guide plate 400 described with reference to FIG. 4 or the light guide plate 500 described with reference to FIG. 5.

[Seventh Embodiment of Light Guide Plate Manufacturing Apparatus]

Figure 16:
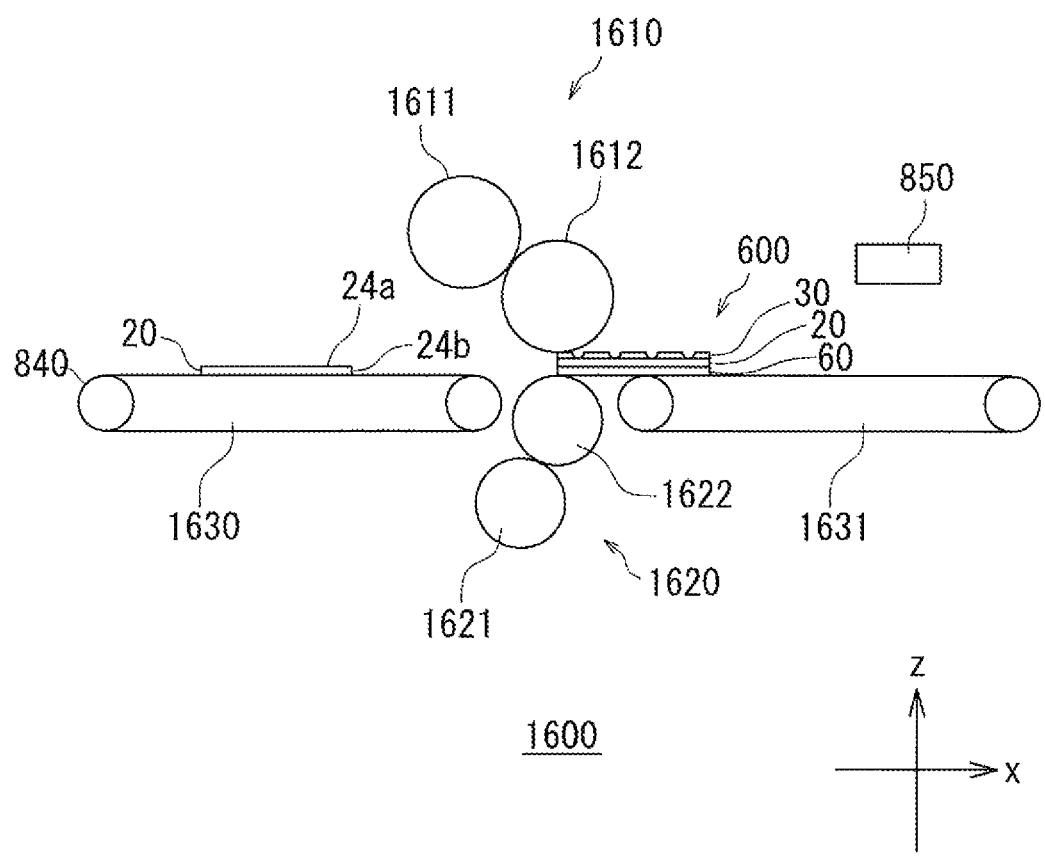
FIG. 16 is a schematic illustration illustrating a light guide plate manufacturing apparatus according to still another embodiment of the present invention.

FIG. 16 is a schematic illustration illustrating a light guide plate manufacturing apparatus 1600 according to yet another embodiment of the present invention. The light guide plate manufacturing apparatus 1600 manufactures the light guide plate 600 described with reference to FIG. 6. The light guide plate manufacturing apparatus 1600 includes a printing section 1610 and a reflective film printing section 1620. The printing section 1610 includes a pattern roll 1611 and a transfer roll 1612. The reflective film printing section 1620 includes a pattern roll 1621 and a transfer roll 1622. The reflective film printing section 1620 is arranged to face the printing section 1610. The printing section 1610 prints an ink for formation of the diffusing member 30 on the main surface 24*a* of the light guide member 20. The reflective film printing section 1620 prints an ink for formation of the reflective film 60 on the main surface 24*b* of the light guide member 20. The light guide plate manufacturing apparatus 1600 may further include conveyance sections 1630 and 1631 that convey the light guide member 20. The conveyance sections 1630 and 1631 are conveyors. The conveyance sections 1630 and 1631 convey the light guide member 20. The conveyance section 1631 is arranged to face the conveyance section 1630 with the reflective film printing section 1620 interposed. The light guide plate manufacturing apparatus 1600 may further include a dryer 850 to dry the ink for formation of the diffusing member 30 and the ink for formation of the reflective film 60. Where any of the inks is cured by a ultraviolet ray, a UV lamp may be provided in place of the dryer 850.

Note that the light guide plate manufacturing apparatus 1600 conveys the light guide member 20 such that the main surfaces 24*a* and 24*b* of the light guide member 20 face in the perpendicular direction (the z direction), but may convey the light guide member 20 such that the main surfaces 24*a* and 24*b* of the light guide member face in the horizontal direction (the y direction). In this case, the light guide plate 600 can be manufactured in a manner that the light guide member 20 is interposed between the printing section 1610 and the reflective film printing section 1620 in the horizontal direction (the y direction).

Description has been made about: the embodiment of the light guide plate 200 in which the diffusing member 40 is formed of a plurality of layers including the first and second layers 40*a* and 40*b*; the embodiment of the light guide plate 200 in which the first and second layers 40*a* and 40*b* are made of the same material; the embodiment of the light guide plate 200 in which the first and second layers 40*a* and 40*b* are made of different materials; the embodiment of the light guide plate 300*b* in which the projection and the depression are formed in the recessed surface of each of the plurality of recesses 41; the embodiment of the light guide plates 400 and 500 in which the second recess 31*b* is larger than the first recess 31*a*; and the embodiment of the light guide plate 600 including the reflective film 60. The present invention can encompass any combinations of at least any two of the light guide plates in the above embodiments as can be apparent to a person skilled in the art.

INDUSTRIAL APPLICABILITY

The light guide plate according to the present invention is suitably employed in liquid crystal display devices, lighting devices, etc.

REFERENCE SIGNS LIST

20 light guide member
22 light incident surface
24*a*, 24*b* main surfaces of light guide member
30 diffusing member
30*a*, 30*b* main surfaces of diffusing member
31 recesses
31*a* first recess
31*b* second recess
40 diffusing member
40*a* first layer
40*b* second layer
40*c* third layer
41 recesses
60 reflective film
70 light source
100 light guide plate
200 light guide plate
300*a* light guide plate
300*b* light guide plate
400 light guide plate
500 light guide plate
600 light guide plate
700 light guide plate
800 light guide plate manufacturing apparatus
810 printing section
810*a* first printing section
810*b* second printing section
810*c* third printing section
820 pattern roll
821 ink charging portion
822 protrusions
822*a* first protrusion
822*b* second protrusion
830 transfer roll
840 conveyance section
850 dryer
1100 light guide plate manufacturing apparatus
1200 light guide plate manufacturing apparatus
1300 light guide plate manufacturing apparatus
1310 timing adjusting means
1400*a* first pattern roll
1400*b* second pattern roll
1410*a*, 1410*b* protrusions
1420*a*, 1420*b* ink charging portion
1430*a*, 1430*b* center line
1500 pattern roll
1510 protrusions
1510*a* first protrusion
1510*b* second protrusion
1520 ink charging portion
1600 light guide plate manufacturing apparatus
1610 printing section
1611 pattern roll
1612 transfer roll
1620 reflective film printing section
1621 pattern roll 1622 transfer roll
1630, 1631 conveyance sections

The invention claimed is:

1. A light guide plate comprising:
a light guide member having a first main surface and a second main surface; and
a diffusing member next to at least one of the first and second main surfaces of the light guide member,
wherein a plurality of recesses are formed in one of the two main surfaces of the diffusing member that is opposite to the main surface next to the light guide member to diffuse light incident to the light guide member at the recesses,
each of the recesses has a recessed surface with a projection and a depression,
the plurality of recesses each has a side surface and a bottom surface,
the respective side surfaces have projections and depressions,
the diffusing member is formed of a plurality of layers including a first layer and a second layer,
the second layer is provided on the first layer,
the plurality of layers further includes a third layer provided on the second layer,
the first layer has a first opening,
the second layer has a second opening,
the third layer has a third opening, and
the second opening in the second layer is displaced from the first opening in the first layer and the third opening in the third layer.

2. The light guide plate of claim 1, wherein
the recesses include a first recess and a second recess, and
when viewing the first main surface of the light guide member in a normal direction, a distance between a light incident surface and the second recess is greater than that between the light incident surface and the first recess, and the second recess is larger than the first recess.

3. The light guide plate of claim 1, further comprising:
a reflective film configured to reflect the incident light on one of the two main surfaces of the light guide member that is opposite to the main surface next to the diffusing member.

4. The light guide plate of claim 1, wherein
the first layer and the second layer are made of the same material.

5. The light guide plate of claim 1, wherein
the first layer and the second layer are made of different materials.

6. A light source device comprising:
the light guide plate of claim 1; and
a light source configured to emit light that is to enter the light guide member.

7. The light guide plate of claim 1, wherein
the plurality of layers have respective openings displaced from one another.

8. The light guide plate of claim 1, wherein
the plurality of recesses each have an opening diameter of at least 20 µm and no greater than 70 µm.

9. A light guide plate manufacturing apparatus comprising
a printing section configured to print an ink for formation of a diffusing member on a light guide member,
wherein the printing section includes a pattern roll and a transfer roll,
an ink charging portion and a plurality of protrusions having a shape corresponding to a shape of recesses of the diffusing member are formed on the pattern roll,
the pattern roll transfers the ink charged in the ink charging portion to the transfer roll, and
the transfer roll prints the ink on the light guide member.

10. The light guide plate manufacturing apparatus of claim 9, wherein
the diffusing member includes a plurality of layers including a first layer and a second layer,
the light guide plate manufacturing apparatus comprising:
a first printing section configured to print an ink for formation of the first layer of the diffusing member; and
a second printing section configured to print an ink for formation of the second layer of the diffusing member,
wherein the first printing section includes a first transfer roll and a first pattern roll having a pattern corresponding to a shape of the first layer, and
the second printing section includes a second transfer roll and a second pattern roll having a pattern corresponding to a shape of the second layer.

11. The light guide plate manufacturing apparatus of claim 10, wherein
the second printing section is arranged such that the second layer is printed in a displaced manner from the first layer.

12. The light guide plate manufacturing apparatus of claim 10, further comprising:
a timing adjusting section configured to adjust timing of printing of the second layer such that the second layer is printed in a displaced manner from the first layer.

13. The light guide plate manufacturing apparatus of claim 10, wherein
a plurality of protrusions having shapes corresponding to shapes of recesses that are formed in the diffusing member are formed on each of the first and second pattern rolls, and the protrusions on the second pattern roll are displaced in a predetermined direction from the protrusions on the first pattern roll.

14. The light guide plate manufacturing apparatus of claim 9, wherein
a plurality of protrusions including a first protrusion and a second protrusion are formed on the pattern roll,
the first and second protrusions are aligned in a predetermined direction, and
the second protrusion is larger than the first protrusion.

15. The light guide plate manufacturing apparatus of claim 9, further comprising:
a reflective film printing section configured to print an ink for formation of a reflective film, the reflective film printing section being arranged to face the printing section.

16. A method for manufacturing a light guide plate comprising:
preparing a light guide member having a first main surface and a second main surface; and
printing an ink using a pattern roll on which an ink charging portion and a plurality of protrusions are formed and a transfer roll such that the ink is next to at least one of the first and second main surfaces of the light guide member to form a diffusing member in which a plurality of recesses corresponding to the plurality of protrusions are formed,
wherein the plurality of recesses are formed in one of the two main surfaces of the diffusing member that is opposite to the main surface next to the light guide member to diffuse light incident to the light guide member at the recesses.

17. The method for manufacturing a light guide plate of claim 16, wherein the diffusing member includes a plurality of layers including a first layer and a second layer,
the printing includes:
  printing an ink for formation of the first layer of the diffusing member; and
  printing an ink for formation of the second layer of the diffusing member.

* * * * *